WATER COOLED POWER OSCILLATOR

Filed Oct. 14, 1963

INVENTORS.
STANLEY ZINN
WILLIAM DILLARD
GEORGE W. McCOOK
BY
Allen M Krass
ATTORNEY United States Patent Office 3,316,499
Patented Apr. 25, 1967

3,316,499
WATER COOLED POWER OSCILLATOR

Stanley Zinn, 23—35 Bell Blvd., Bayside, N.Y. 11360; William Dillard, 26 Madison St., New York, N.Y. 10038; and George W. McCook, R.D. 1, Box 117, Boalsburg, Pa. 16827
Filed Oct. 14, 1963, Ser. No. 315,857
2 Claims. (Cl. 331—70)

This invention relates to an oscillator for generating high frequency electro-magnetic currents at relatively high power levels and to such a structure which employs a unique cooling system.

Vacuum tube oscillators which convert direct current into alternating current at frequencies in excess of about 50 kc. at power levels in the kilowatt range and above are commonly employed for radio transmitters, induction and dielectric heating equipment and the like. Relatively large quantities of heat are dissipated in the tank coils and plates in such circuits.

It is the primary object of the present invention to provide a high frequency vacuum tube oscillator with water cooling for both the vacuum tube and tank circuit which employs an unusually compact and efficient cooling apparatus.

Because of the high conductivity of water at the frequencies utilized in generators of this type, and the fact that the cooling water must be in intimate (non-insulated) contact with the elements being cooled, the cooling lines must be constructed within rigid limitations to avoid affecting the electrical properties of the oscillator. For example, it is common practice to employ a grounded cathode Hartley oscillator in such generators. When the power level in a grounded cathode Hartley oscillator is such that both the plate of the vacuum tube and the tank coil must be water cooled, separate circuits must be provided for each cooling operation since a common water supply would provide a direct electrical path from the tank circuit to the plate, thereby shorting out the oscillator's direct current power supply. In such circuits since the water supply system is grounded at some point the cooling coils for the plate of the vacuum tube must be formed of non-conductive material, such as a rubber or a ceramic. The column must also be formed of sufficient length so that the linear resistance of the water column prevents the plate from being grounded or shorted to the tank coil.

As a solution to this problem the primary object of the present invention is to provide a vacuum tube power oscillator which employs a grounded plate oscillator wherein one end of the tank coil is directly electrically connected to the plate of the tube and in which a single continuous cooling path is provided for both the tank coil and the vacuum tube plate.

An obstacle to the implementation of this novel system resides in the fact that in a normal oscillator the heat dissipation at the plate is generally much greater than the heat dissipation at the tank coil. Accordingly, larger quantities of water are needed to cool the tube than to cool the coil. The present invention therefore makes use of a device wherein the tube is disposed in a pressurized fluid filled container. The heat dissipated by the plate of the tube causes the sealed fluid to vaporize and therefore accept a much higher heat content from the tube than would be the case if the fluid were in a liquid state. The water cooling system passes through a coil disposed in the pressurized container and receives heat from this fluid. The use of such a tube cooling system, which is commercially available, and the increased heat transfer efficiency achieved thereby permits the use of tubing for the tank coil which is of small enough diameter to achieve the necessary electrical characteristics for such a coil.

A preferred embodiment of the present invention employs a bifilar coil to feed the tank coil and the plate of the tube. The fluid circuit is from the coil tap up through the coil to the plate of the tube and back down to the tap. In the preferred embodiment a separate bifilar circuit in parallel with this first circuit cools the grid end of the tank coil.

Because the water entering the circuit is pre-heated by the exiting water, condensation on the outside of the tank coil is eliminated as long as the tube temperature is above the ambient dew point.

In the preferred embodiment of the invention the tank coil itself is formed of copper tubing which is the major section of the fluid circuit. This copper tubing connects to the plate cooling coil making the electrical connection between the plate and the coil end.

It is thus an object of the present invention to provide a vacuum tube power oscillator employing a circuit wherein one end of the tank coil may be directly connected to the plate of the vacuum tube and wherein a single length of bifilar copper tubing is used to form the tank coil, the connection between the tank coil and the plate circuit, and both an entry and return conduit for cooling water for both the tank coil and the vacuum tube.

It is a further object to provide such a circuit wherein the vacuum tube is supported in a sealed container of fluid which vaporizes to aid in the heat transfer to the cooling water.

A further object is to provide such a circuit in which the grid end of the tank coil is formed of bifilar winding disposed in parallel with the plate cooling winding.

Other objects, advantages and applications of the present invention will be made apparent by the following detailed description of a preferred embodiment of the invention. The description makes reference to the accompanying drawings in which.

Figures 1, 2, 3:
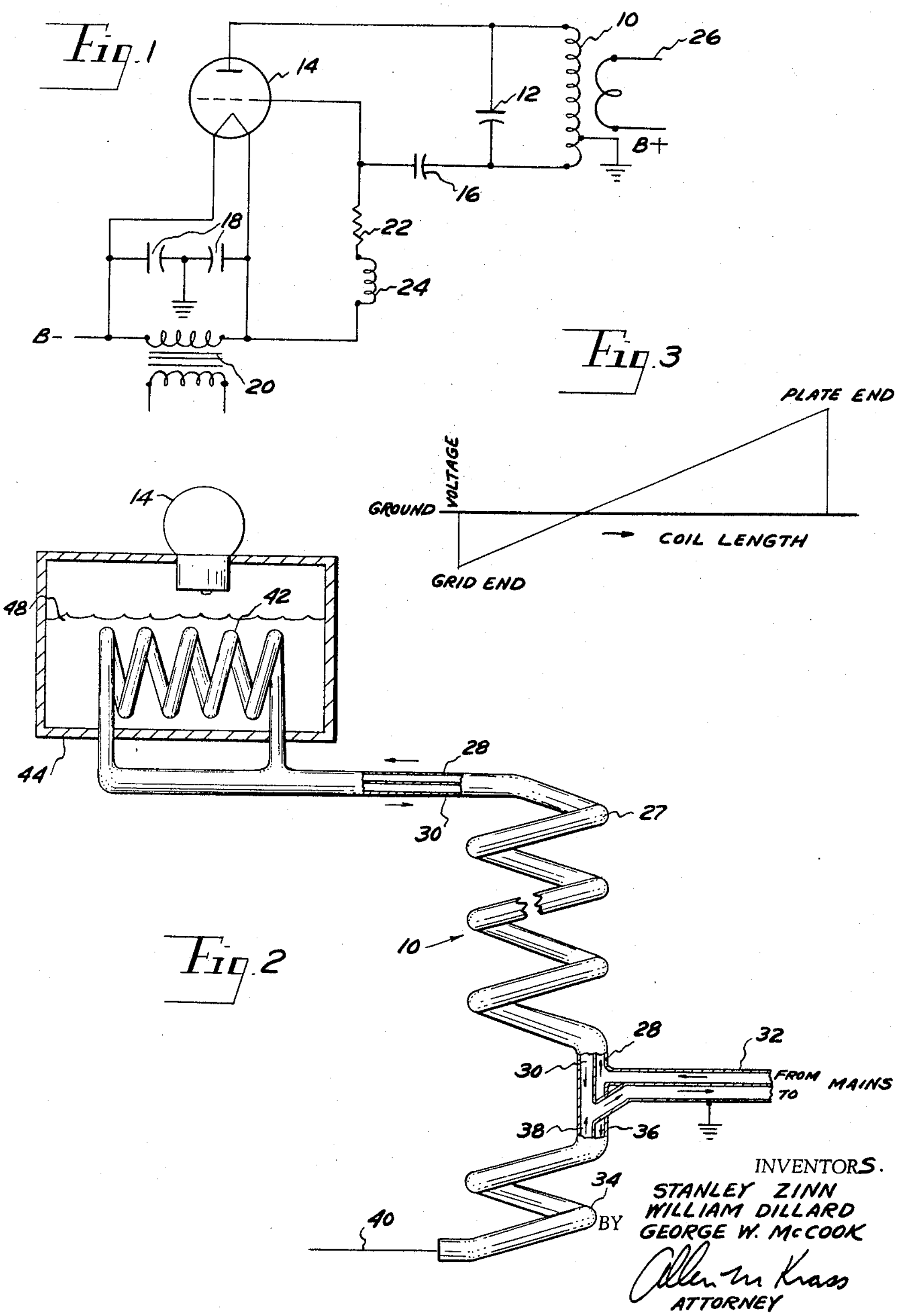
FIGURE 1 is a schematic drawing of the oscillator circuit employed in the preferred embodiment.
FIGURE 2 is a schematic mechanical view of the metallic tubing which forms the tank coil and connects to the vacuum tube cooling unit.
FIGURE 3 is a diagram illustrating the potential gradient which exists along the tank coil.

While the preferred embodiment of the invention may be employed in connection with any tuned oscillator circuit which utilizes a direct connection between one end of the tank coil and the vacuum tube plate, it is illustrated in connection with a grounded plate circuit.

Referring to FIGURE 1, a tank coil 10 which is formed of a bifilar copper tubing, is shunted by a tank capacitor 12. One end of the juncture between the capacitor 12 and the coil 10 connects to the plate of a vacuum tube 14. The other end of the tank circuit connects to the grid of the tube 14 through a blocking capacitor 16. A pair of capacitors 18 shunt the filament of the tube 14 and have their midpoint grounded so as to act as a radio frequency by-pass circuit. The filament is energized through a transformer 20 which has one end connected to a negative side of the plate power supply. The other end of the transformer is connected to the grid through a bias resistor 22 and a grid choke 24. The secondary of the output transformer 26 will normally consist of a single turn disposed in proximity to the tank coil 10 although in certain applications the work may be inserted directly into the primary so as to itself act as the secondary.

The structure of the plate and tank coil cooling system is illustrated in FIGURE 2. The coil 10 is formed of a bifilar copper tube 27 which is spirally wound to provide the desired inductance value. The tube 27 has a pair of separated fluid channels 28 and 30. These channels receive cooling water from a connecting section 32 also formed of bifilar tubing connecting to the delivery and return points on the water mains. This main section 32 is grounded and connected to the B+ voltage and represents the center tap of the tank coil.

A parallel connecting section of bifilar tubing 34 forms the grid end of the tank coil. It has double flow channels 36 and 38 which are connected in parallel with the sections 28 and 30. An electrical connection 40 at the lower end of the grid end portion of the coil connects to the juncture of the capacitors 12 and 16. A separate flow channel might be employed for this grid end in other embodiments.

The plate end of the tank coil connects to a cooling coil 42 which is disposed within a sealed cooling container 44 The coil 42 is so connected to the coils 28 and 30 that the water flowing through one channel of the bifilar tube passes through the coil 42 and returns through the other channel. The container 44 may be a portion of a commercially obtainable closed or sealed cooling unit for the vacuum tube 14. The tube is disposed with one end inside of the container 44. A fluid 48 which is disposed within the container vaporizes under the heat of the plate dissipation of the tube 14. This generates a vapor from the fluid and greatly increases the heat content of the fluid. By thus improving the heat transfer between the fluid 48 and the water in the coil 42 the amount of water required to cool the tube 14 is minimized. The plate of the tube 14 is electrically connected to the container 44 which is of conductive material so as to form a direct electrical connection between the coil 42 and the tube 46.

The heated water which returns through the bifilar tube path 30 preheats the incoming water in the channel 28 so as to prevent condensation on the tank coil 10.

By use of this common cooling circuit for the plate and tank coil in connection with a grounded plate circuit the conductivity of the cooling water is employed along the length of a single continuous conductor. While the conductivity of the water must be considered in calculating the inductance of the tank coil, the higher conductivity of the tubing minimizes its effect on the conductance of the coil so that variations in impurity and temperature of the water will not alter the performance of the circuit.

FIGURE 3 illustrates the manner in which the potential difference varies along the length of the tank coil between the grid end and the plate end.

Having thus described the invention, we claim:

1. In a power oscillator which includes a vacuum tube having a filament, a grid and a plate, and a tank circuit having a capacitor shunted winding with one end connected by a line to the plate of said vacuum tube and another end connected by another line through a blocking capacitor to the grid thereof, said tank circuit having a ground connection at an intermediate point thereof and said filament being connected to said grid through a choke coil and a bias resistor, the improvement which consists of: a unitary bifilar metallic tubing defining a pair of separate fluid channels and forming the winding of said tank circuit and the lines connecting said winding to the grid and plate of said vacuum tube; a sealed cooling container supporting said vacuum tube and forming the electrical connection between said plate and the bifilar metallic tubing forming the line connecting one end of said winding to the plate of said vacuum tube; a first coolant fluid contained within said sealed cooling container for cooling the plate of said vacuum tube; an intake and an outlet for a second coolant fluid, said intake and outlet being at ground potential; a cooling coil disposed in said first coolant fluid in said cooling container; a first pair of fluid connections with said inlet and outlet for circulating said second coolant fluid within the separate channels of said bifilar tubing; and a second pair of fluid connections for connecting each end of said cooling coil to each fluid channel of said bifilar tubing so as to cool said first coolant by way of said second coolant fluid circulating through said cooling coil.

2. The improvement of claim 1 wherein the plate of said vacuum tube is cooled by vaporizing said first coolant fluid and said cooling coil is disposed within said sealed cooling container for condensating said first coolant fluid.

References Cited by the Examiner

UNITED STATES PATENTS

| | | | |
|---|---|---|---|
| Re.19,371 | 11/1934 | Gebhard | 315—50 X |
| 2,160,655 | 5/1939 | Hansell | 331—70 X |
| 2,453,433 | 11/1948 | Hansen et al. | 315—50 X |
| 2,490,081 | 12/1949 | Mittelmann | 331—70 X |
| 2,643,282 | 6/1953 | Greene | 174—15 |

FOREIGN PATENTS

| | | |
|---|---|---|
| 1,156,660 | 12/1957 | France. |

ROY LAKE, *Primary Examiner.*

J. B. MULLINS, *Assistant Examiner.*